United States Patent
Bigelow et al.

(10) Patent No.: US 7,191,347 B2
(45) Date of Patent: Mar. 13, 2007

(54) NON-DISRUPTIVE POWER MANAGEMENT INDICATION METHOD, SYSTEM AND APPARATUS FOR SERVER

(75) Inventors: Brian E. Bigelow, Apex, NC (US); Jospeh E. Bolan, Morrissville, NC (US); Gregory W. Dake, Durham, NC (US); Harold D. Hudson, Pittsboro, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/248,255

(22) Filed: Dec. 31, 2002

(65) Prior Publication Data
US 2004/0128562 A1 Jul. 1, 2004

(51) Int. Cl.
G06F 1/00 (2006.01)
(52) U.S. Cl. .................. 713/300; 713/330; 713/340
(58) Field of Classification Search ........... 713/300, 713/330, 340; 361/752, 788; 307/141; 710/300, 710/301
See application file for complete search history.

(56) References Cited

U.S. PATENT DOCUMENTS

| 6,308,240 | B1 * | 10/2001 | De Nicolo | 710/300 |
| 6,578,099 | B1 * | 6/2003 | Bassman et al. | 710/301 |
| 6,594,771 | B1 * | 7/2003 | Koerber et al. | 713/330 |
| 6,661,671 | B1 * | 12/2003 | Franke et al. | 361/752 |
| 6,968,470 | B2 * | 11/2005 | Larson et al. | 713/340 |
| 2002/0112191 | A1 * | 8/2002 | Pelissier et al. | 713/300 |

FOREIGN PATENT DOCUMENTS

JP 11164476 A * 6/1999

* cited by examiner

Primary Examiner—Thomas Lee
Assistant Examiner—Suresh K Suryawanshi
(74) Attorney, Agent, or Firm—John Biggers; Cynthia S. Boyd; Biggers & Ohanian, LLP

(57) ABSTRACT

The present invention facilitates the management of blade server information handling systems by providing a non-disruptive indication signal for power management to a Management Module or similar. By providing said functionality and method, the power available to power the management module at a particular instance, in relationship to the power state of the chassis may be determined, such that power may be configured in a non-disruptive manner for the management module. Said functionality and method also provides for both the safe and efficient powering of a server from cold start or the hot-plugging of a management module into an active, powered chassis.

20 Claims, 7 Drawing Sheets

NON-DISRUPTIVE POWER MANAGEMENT INDICATION METHOD, SYSTEM AND APPARATUS FOR SERVER

CROSS REFERENCE TO RELATED APPLICATIONS

The subject matter of this application is related to U.S. patent applications filed on Nov. 27, 2002, awaiting serial number assignments, having respective Ser. Nos. 10/306,303, 10/306,304, and 10/306,302, of which, the teachings of each are incorporated herein by reference.

FIELD AND BACKGROUND OF THE INVENTION

The present invention relates generally to the management of information handling systems (IHS) and devices therein and more particularly to an apparatus, system and method for the non-disruptive management of server systems.

It is known that one way to segment the overarching category of information handling systems is to distinguish between workstations and servers. Workstations are typically used by an individual operator to perform tasks which are at least somewhat individualized, such as processing documents, spreadsheets or the like. By way of example, workstations include but are not limited to desktop systems, notebook systems, PDAs or the like. Server systems typically are connected with workstations and with other servers via networks and communication architectures, either wired, wireless or mixed, and these server systems provide support for tasks undertaken on workstations, as by storing or moving large volumes of data, handling mail and other transactions. The respective functions of workstations and server systems are well known to persons of skill in the arts of information technology and hence, an extended discussion here is unnecessary.

Heretofore, an IHS functioning as a sever system frequently was self contained within an appropriately configured housing. However, given the increased demands on server systems resulting in part from the increasing spread of networks and the services available through said networks, alternate technologies have been proposed to improve server system availabilities. An example of one such alternate technology is a format known as a blade server.

A blade server provides functionality comparable to or beyond that previously available in a "free standing" or self contained server by housing a plurality of information handling systems in a compact space and a common housing. In the blade server format, each server system is configured to be present in a compact package known as a "blade" or a "server blade" which can be inserted in a chassis along with a number of other blades. In general, the blade format provides for the placement of an independent server onto an easily pluggable card. Often certain services for the blades may be consolidated so that the common services can be shared among the jointly-housed blades.

At present, the IHS marketplace is driven by customers who demand that information systems be scalable, available, and efficiently managed, resulting in the continued evolution in design of servers. Recently, however, with the move to consolidated data centers, standalone pedestal servers with attached storage have been giving way to rack-optimized servers in order to increase server density and better utilize valuable floor space. The blade architecture represents the next step in this server evolution: a shift to servers packaged as single boards and designed to be housed in chassis that provide access to all shared services.

A server blade has been defined as an inclusive computing system that includes processors and memory on a single board. Most notably however, power, cooling, network access, and storage services are not necessarily contained on the server blade. The necessary resources, which can be shared among a collection of blades, are accessed through a connection plane of the chassis; that is, the power and bus connections are a part of the cabinet that houses a collection of the blades. Blades are easily installed and removed and are smaller than rack-optimized servers. Blades may be general-purpose servers, or they may be tailored and pre-configured for specific data center needs (e.g., as security blades with firewall, virtual private network [VPN], and intrusion detection software preinstalled).

It has been known and practiced for some time in management of networks that information handling devices participating in the network can be managed from a common console through the use of technology such as the Simple Network Management Protocol or SNMP. SNMP, which has been adopted as an industry standard, contemplates that devices in a network will generate signals indicative of the states of the devices and thus report those states, such as "power on", to the network management console. Such signaling permits a network administrator to more readily manage the network by assuring that the occurrence of significant events is noticed and any necessary corrective action is taken.

Multiple power supplies may be used to supply power to the insertable and removal components of IHS systems, in part to enhance overall system's reliability, meet the growing demand for more power from the insertable and removable components and provide cost flexibility to end users (purchase and install the power supply when it is needed). However, if certain components, such as blades, are inserted into the system such that such components would be supplied with or connected to an inappropriate current or voltage, the component could be severally damaged, power flow could exceed design thresholds, or other system components could be damaged.

As used herein, the term "Management Module" refers to plugable systems that provide basic management functions such as monitoring, alerting, restarting, etc., including those functions required to manage shared resources, such as the ability to switch keyboard, video and mouse signals from one Processor Blade to another. Typically, a mid plane board provides for connectivity as between Processor Blades, power modules, switch modules, and the like, and also provides interconnections between plugable systems.

As used herein, the term "Processor Blade" refers to a particular subsystem that carries host processor, memory, central electronics, etc., for a server blade.

As used herein, the term "Switch Module" refers to a plugable susbsystem that provides Ethernet, Fiber Channel, or other network technology switching capabilities to a chassis wherein the chassis typically holds the plugable Processor Blades, power modules, switch modules, management modules, etc.

As used herein, the term "Server Blade System" refers to an IHS having a main chassis into which a plurality of "server blades" (previously discussed) are slidably inserted into slots of the main chassis.

BRIEF SUMMARY OF THE INVENTION

Accordingly, there is a need for an method, system and apparatus that overcomes the problems discussed above. With the foregoing discussion in mind, it is a purpose of the present invention to facilitate the management of blade server information handling systems by providing a non-disruptive indication signal for power management to a Management Module or similar. By providing said functionality and method, the power available to power the management module at a particular instance, in relationship to the power state of the chassis may be determined, such that power may be configured in a non-disruptive manner for the management module. Said functionality and method also provides for both the safe and efficient powering of a server from cold start or the hot-plugging of a management module into an active, powered chassis.

According to one embodiment, the present invention is an Apparatus comprising: a chassis for housing a plurality of information handling system blade servers, a plurality of power sources, where each of said plurality of power sources having a power delay signal means, a management module having a power detection means and operatively connected to receive a delayed power indication signal from said plurality of power sources and provide a power configuration indication signal.

According to another embodiment, the present invention is a method comprising the steps of: housing a plurality of information handling system blade servers, a plurality of power sources, and a management module within a common chassis, receiving a delayed power indication signal from one or more of said plurality of power sources at Detection means of said Management Module, wherein said delayed power indication signal is of a value in relation to a chassis power state, and providing a power configuration indication signal from said Detection means for configuring a power state to a predetermined setting.

According to another embodiment, the present invention is a system comprising: a server having a chassis for housing a plurality of information handling system blade servers, a plurality of power sources, each of said plurality of power sources having a power delay signal means, a management module having a power detection means and operatively connected to receive a delayed power indication signal from said plurality of power sources and provide a power configuration indication signal, and a software means operatively connected and stored accessible to said plurality of power sources and said management module and effective when executing to configure a power state to a predetermined setting in response to receiving said power configuration indication signal.

BRIEF DESCRIPTION OF THE SEVERAL VIEWS OF THE DRAWINGS

Other aspects, features, and advantages of the present invention will become more fully apparent from the following detailed description, the appended claims, and the accompanying drawings in which:

DETAILED DESCRIPTION OF THE INVENTION

Figure 1:
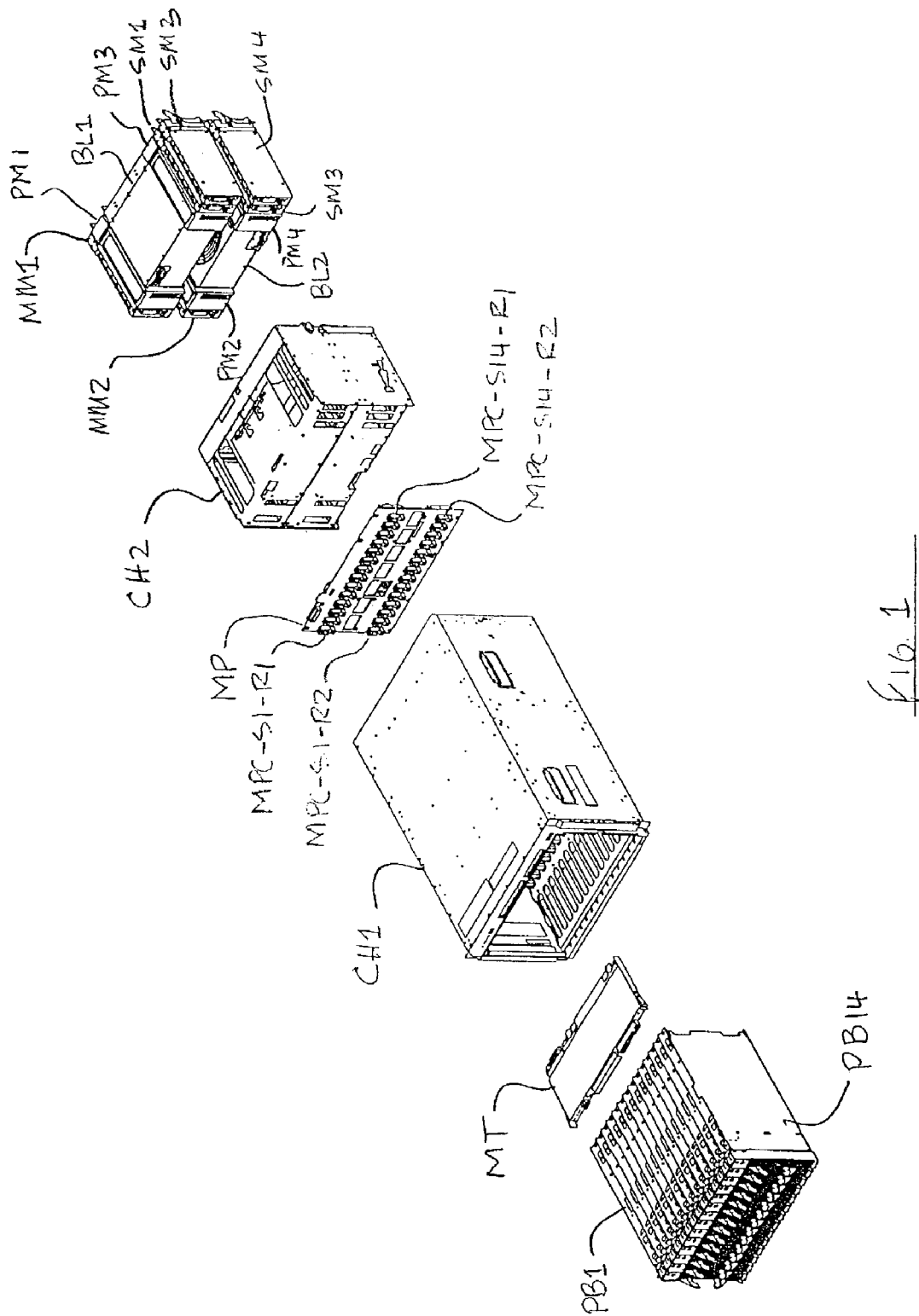
FIG. 1 is a front, top and right side exploded perspective view of a server blade system, according to one embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

FIG. 1 is a front, top and right side exploded perspective view of a server blade system, according to one embodiment of the present invention. Referring to this figure, main chassis CH1 houses all the components of the server blade system. Up to 14 processor blades PB1 through PB14 (or other blades, such as storage blades) are hot plugable into the 14 slots in the front of chassis CH1. The term "server blade", "processor blade", or simply "blade" is used throughout the specification and claims, but it should be understood that these terms are not limited to blades that only perform "processor" or "server" functions, but also include blades that perform other functions, such as storage blades, which typically include hard disk drives and whose primary function is data storage.

Processor blades provide the processor, memory, hard disk storage and firmware of an industry standard server. In addition, they include keyboard, video and mouse ("KVM") selection via a control panel, an onboard service processor, and access to the floppy and CD-ROM drives in the media tray. A daughter card is connected via an onboard PCI-X interface and is used to provide additional high-speed links to switch modules SM3 and SM4 (described below). Each processor blade also has a front panel with 5 LED's to indicate current status, plus four push-button switches for power on/off, selection of processor blade, reset, and NMI for core dumps for local control.

Blades may be 'hot swapped' without affecting the operation of other blades in the system. A server blade is typically implemented as a single slot card (394.2 mm×226.99 mm); however, in some cases a single processor blade may require two slots. A processor blade can use any microprocessor technology as long as it compliant with the mechanical and electrical interfaces, and the power and cooling requirements of the server blade system.

For redundancy, processor blades have two signal and power connectors; one connected to the upper connector of the corresponding slot of midplane MP (described below), and the other connected to the corresponding lower connector of the midplane. Processor Blades interface with other components in the server blade system via the following midplane interfaces: 1) Gigabit Ethernet (2 per blade; required); 2) Fibre Channel (2 per blade; optional); 3) management module serial link; 4) VGA analog video link; 4) keyboard/mouse USB link; 5) CD-ROM and floppy disk drive ("FDD") USB link; 6) 12 VDC power; and 7) miscellaneous control signals. These interfaces provide the ability to communicate to other components in the server blade system such as management modules, switch modules, the CD-ROM and the FDD. These interfaces are duplicated on the midplane to provide redundancy. A processor blade typically supports booting from the media tray CDROM or FDD, the network (Fibre channel or Ethernet), or its local hard disk drive.

A media tray MT includes a floppy disk drive and a CD-ROM drive that can be coupled to any one of the 14 blades. The media tray also houses an interface board on which is mounted interface LED's, a thermistor for measuring inlet air temperature, and a 4-port USB controller hub. System level interface controls consist of power, location, over temperature, information, and general fault LED's and a USB port.

Midplane circuit board MP is positioned approximately in the middle of chassis CH1 and includes two rows of connectors; the top row including connectors MPC-S1-R1 through MPC-S14-R1, and the bottom row including connectors MPC-S1-R2 through MPC-S14-R2. Thus, each one of the 14 slots includes one pair of midplane connectors located one above the other (e.g., connectors MPC-S1-R1 and MPC-S1-R2) and each pair of midplane connectors mates to a pair of connectors at the rear edge of each processor blade (not visible in FIG. 1).

Figure 2:
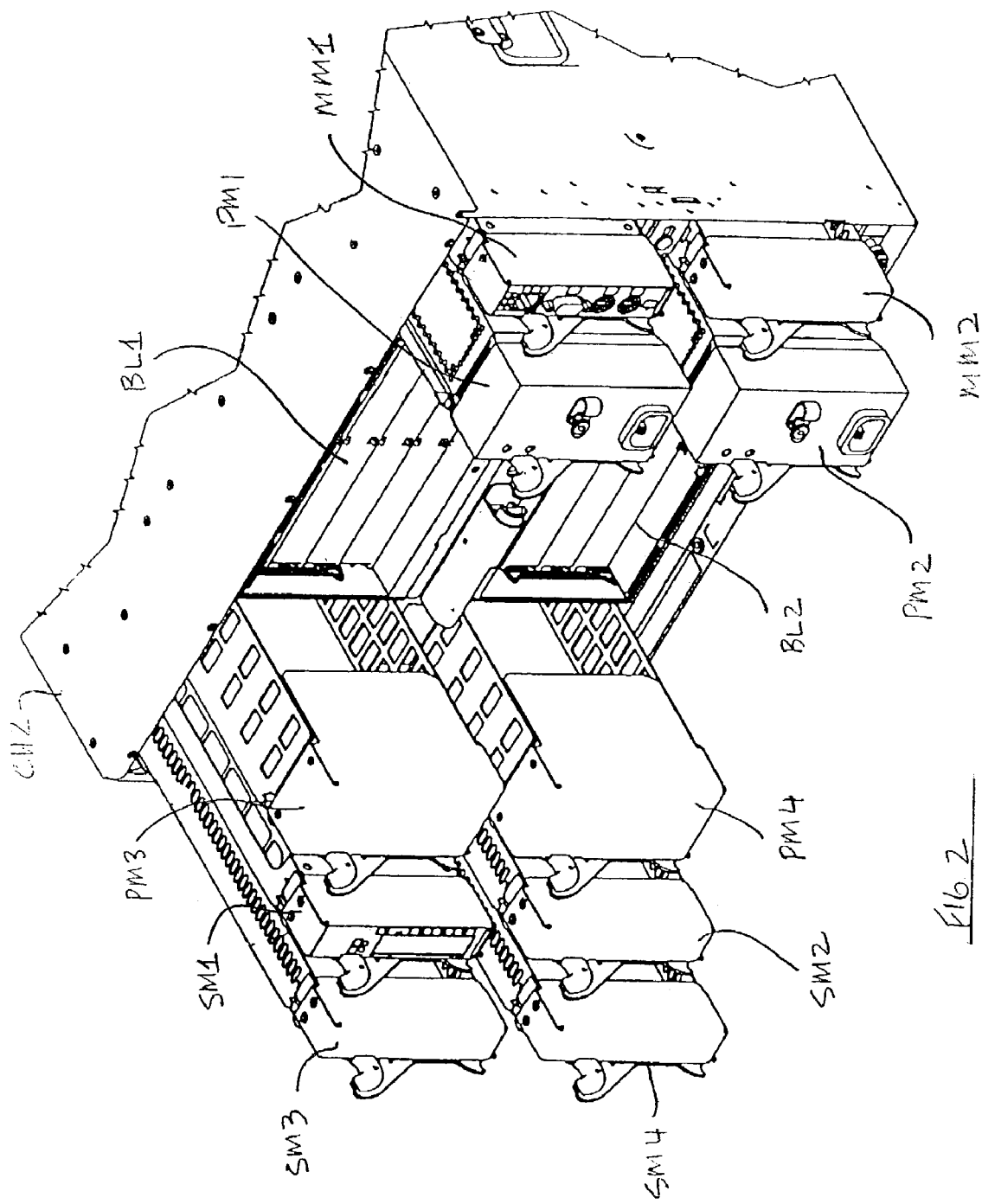
FIG. 2 is a rear, top and left side perspective view of the rear portion of the server blade system, according to one embodiment of the present invention.

FIG. 2 is a rear, top and left side perspective view of the rear portion of the server blade system, according to one embodiment of the present invention. Referring to FIGS. 1 and 2, a chassis CH2 houses various hot plugable components for cooling, power, control and switching. Chassis CH2 slides and latches into the rear of main chassis CH1.

Two hot plugable blowers BL1 and BL2 include backward-curved impeller blowers and provide redundant cooling to the server blade system components. Airflow is from the front to the rear of chassis CH1. Each of the processor blades PB1 through PB14 includes a front grille to admit air, and low-profile vapor chamber based heat sinks are used to cool the processors within the blades. Total airflow through the system chassis is about 300 CFM at 0.7 inches H2O static pressure drop. In the event of blower failure or removal, the speed of the remaining blower automatically increases to maintain the required air flow until the replacement unit is installed. Blower speed control is also controlled via a thermistor that constantly monitors inlet air temperature. The temperature of the server blade system components are also monitored and blower speed will increase automatically in response to rising temperature levels as reported by the various temperature sensors.

Four hot plugable power modules PM1 through PM4 provide DC operating voltages for the processor blades and other components. One pair of power modules provides power to all the management modules and switch modules, plus any blades that are plugged into slots 1–6. The other pair of power modules provides power to any blades in slots 7–14. Within each pair of power modules, one power module acts as a backup for the other in the event the first power module fails or is removed. Thus, a minimum of two active power modules are required to power a fully featured and configured chassis loaded with 14 processor blades, 4 switch modules, 2 blowers, and 2 management modules. However, four power modules are needed to provide full redundancy and backup capability. The power modules are designed for operation between an AC input voltage range of 200 VAC to 240 VAC at 50/60 Hz and use an IEC320 C14 male appliance coupler. The power modules provide +12 VDC output to the midplane from which all server blade system components get their power. Two +12 VDC midplane power buses are used for redundancy and active current sharing of the output load between redundant power modules is performed.

Management modules MM1 through MM4 are hot-plugable components that provide basic management functions such as controlling, monitoring, alerting, restarting and diagnostics. Management modules also provide other functions required to manage shared resources, such as the ability to switch the common keyboard, video, and mouse signals among processor blades.

Figure 3:
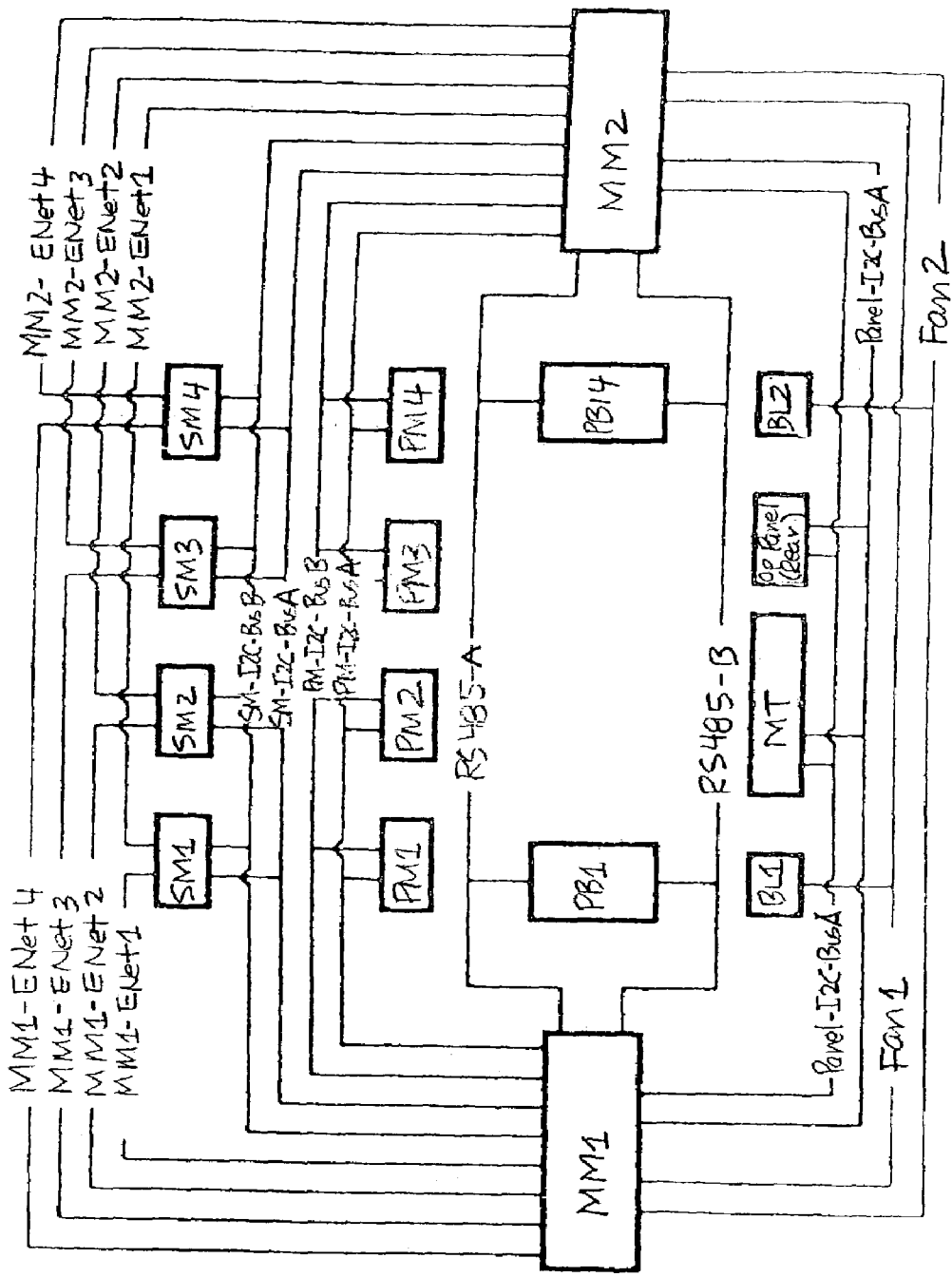
FIG. 3 is a schematic diagram of the server blade system's management subsystem, according to one embodiment of the present invention.

FIG. 3 is a schematic diagram of the server blade system's management subsystem, according to one embodiment of the present invention. Referring to this figure, each management module has a separate Ethernet link to each one of the switch modules SM1 through SM4. Thus, management module MM1 is linked to switch modules SM1 through SM4 via Ethernet links MM1-ENet1 through MM1-ENet4; and management module MM2 is linked to the switch modules via Ethernet links MM2-ENet1 through MM2-ENet4. In addition, the management modules are also coupled to the switch modules via two well known serial 12C buses SM-12C-BusA and SM-12C-BusB, which provide for "out-of-band" communication between the management modules and the switch modules. Similarly, the management modules are also coupled to the power modules PM1 through PM4 via two serial 12C buses PM-12C-BusA and PM-12C-BusB. Two more 12C buses Panel-12C-BusA and Panel-12C-BusB are coupled to media tray MT and the rear panel. Blowers BL1 and BL2 are controlled over separate serial buses Fan1 and Fan2. Two well known RS485 serial buses RS485-A and RS485-B are coupled to server blades PB1 through PB14 for "out-of-band" communication between the management modules and the server blades.

Figure 4:
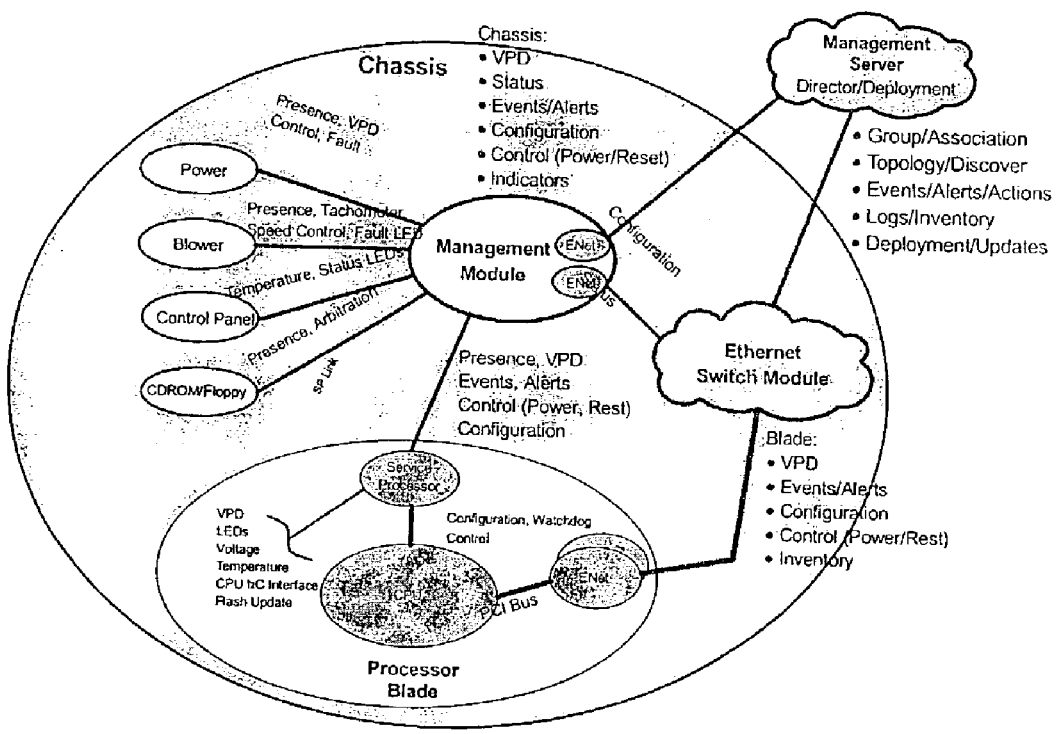
FIG. 4 is a topographical illustration of the server blade system's management functions, according to one embodiment of the present invention.

FIG. 4 is a topographical illustration of the server blade system's management functions, according to one embodiment of the present invention. Referring to FIGS. 3 and 4, each of the two management modules has a 100 Mbps Ethernet port that is intended to be attached to a private, secure management server. The management module firmware supports a web browser interface for either direct or remote access. Each processor blade has a dedicated service processor (SP) for sending and receiving commands to and from the management modules. The data ports that are associated with the switch modules can be used to access the processor blades for image deployment and application management, but are not intended to provide chassis management services. A management and control protocol allows the management module to authenticate individual blades as part of the blade activation procedure. A management module can also send alerts to a remote console to indicate changes in status, such as removal or addition of a blade or module. A management module also provides access to the internal management ports of the switch modules and to other major chassis subsystems (power, cooling, control panel, and media drives).

The management module communicates with each processor blade service processor via the out-of-band serial bus, with one management module acting as the master and the processor blade's service processor acting as a slave. For redundancy, there are two serial busses (one bus per midplane connector) to communicate with each processor blade's service processor. The processor bade is responsible for activating the correct interface to the top or bottom midplane connector based upon the state of the signals from the active management module. When two management modules are installed, the module in slot 1 will normally assume the active management role, while the module in slot 2 will be reserved as a standby module. In event of management module failure or removal after the chassis subsystems have been initialized, the operation of the processor blades and switch subsystems are not affected. Thus, if both management modules are inactive or removed, the server blade system's components will continue to function, but chassis configuration cannot be changed. Addresses are hardwired for each slot on each top and bottom midplane connector, and used by a processor blade's service processor to determine which processor blade is being addressed on the serial bus.

Each of the four switch modules SM1 through SM4 has a dedicated 100 Mbps Ethernet link to the two management modules MM1 and MM2. This provides a secure high-speed communication path to each of the switch modules for control and management purposes only. The 12C serial links are used by the management module to internally provide control of the switch module and to collect system status and vendor product data ("VPD") information. To accomplish this, the various control and data areas within the switch modules, such as status and diagnostic registers and VPD information, are accessible by the management module firmware. In general, the active management module can detect the presence, quantity, type, and revision level of each blade, power module, blower, and midplane in the system, and can detect invalid or unsupported configurations (e.g., processor blades with Fibre Channel daughter cards connected to Ethernet switch modules.) This function relies upon VPD information within each subsystem as well as signals from the various hardware interfaces or communication via the service processor protocols.

Figure 5:
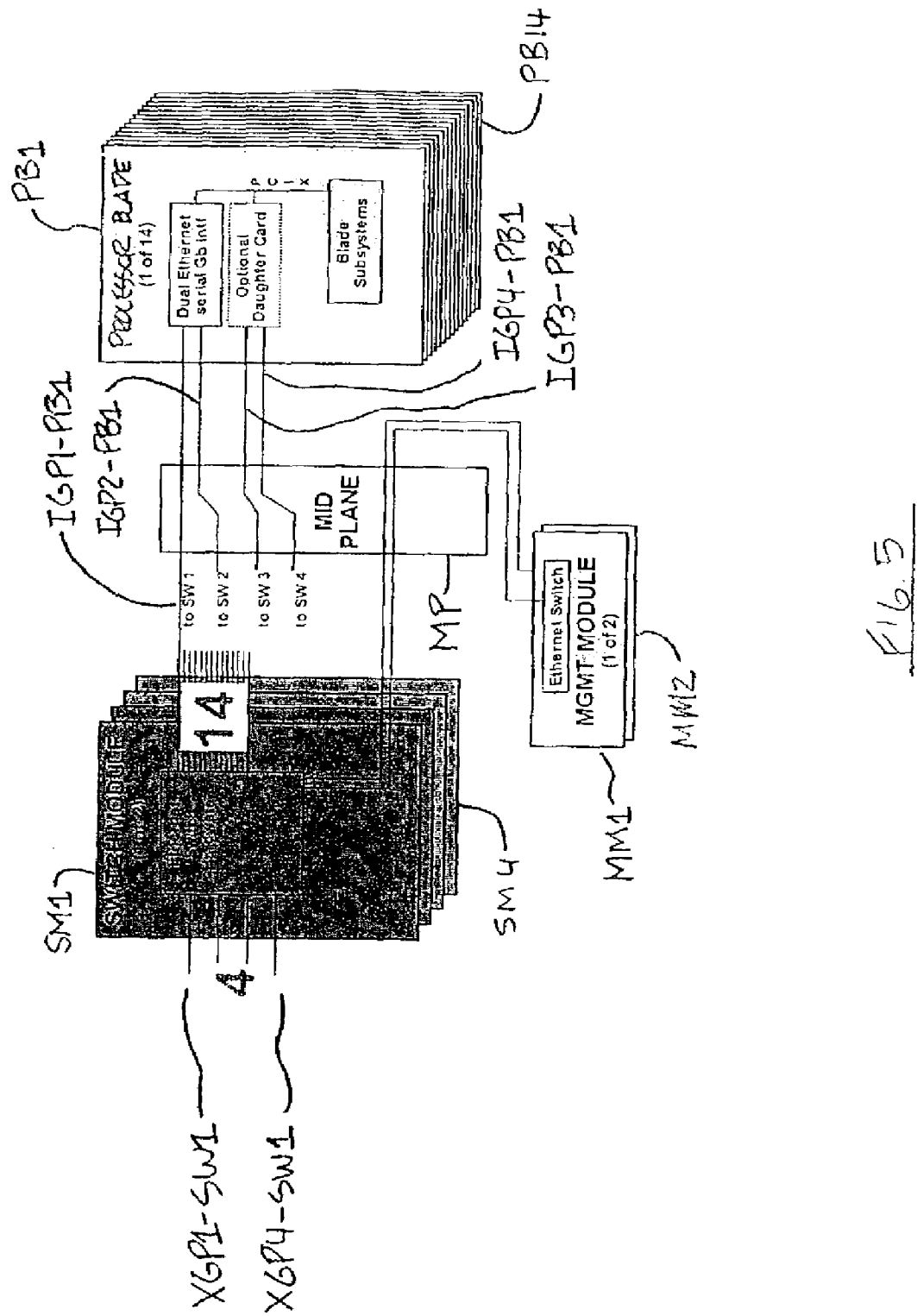
FIG. 5 is a block diagram of the switch module and processor blade interconnection, according to one embodiment of the present invention.

FIG. 5 is a block diagram of the switch module and processor blade interconnection, according to one embodiment of the present invention. Referring to this figure, each switch module SW1 through SW4 includes four external gigabit ports. For example, switch module SW1 includes external gigabit ports XGP1-SW1 through XGP4-SW1. Each processor blade includes four internal gigabit ports coupling the processor blade to each one of the four switch modules through the midplane connectors. For example, processor blade PB1 includes four internal gigabit ports IGP1-PB1 through IGP4-PB1. In addition, each management module is coupled to the switch module via an Ethernet link.

The Ethernet Switch Modules are hot-plugable components that provide Ethernet switching capabilities to the server blade system. The primary purpose of the switch module is to provide Ethernet interconnectivity between the processor blades, management modules and the outside network infrastructure. Depending on the application, the external Ethernet interfaces may be configured to meet a variety of requirements for bandwidth and function. One Ethernet switch module is included in the base system configuration, while a second Ethernet switch module is recommended for redundancy. Each processor blade has a dedicated, 1000 Mbps (1 Gbps) full-duplex SERDES link to each of the two switch modules, and each switch module has four external 1 Gbps (RJ45) ports for connection to the external network infrastructure.

Fibre Channel (FC) is an industry standard networking scheme for sharing remote storage devices among a group of servers. Each processor blade includes a connector to accept a Fibre Channel daughter board containing two Fibre Channel ports of 2 Gb each for connection to dual Fibre Channel switch modules. The routing of the Fibre Channel signals occurs through the midplane to the Fibre Channel switch modules in slots 3 and 4 in the rear of the server blade chassis. Each Fibre Channel switch module is hot-plugable without disruption of blade or chassis operation. The routing of the two Fibre Channel ports is such that one port from each processor blade is wired to one Fibre Channel switch module, and the other port is wired to the other Fibre Channel switch module to provide redundancy. Each Fibre Channel switch module has 2 external 2 Gb ports for attachment to the external Fibre Channel switch and storage infrastructure. This option allows each of the 14 processor blades to have simultaneous access to a Fibre Channel based storage area network (SAN) as well as the Ethernet based communications network.

Figure 6:
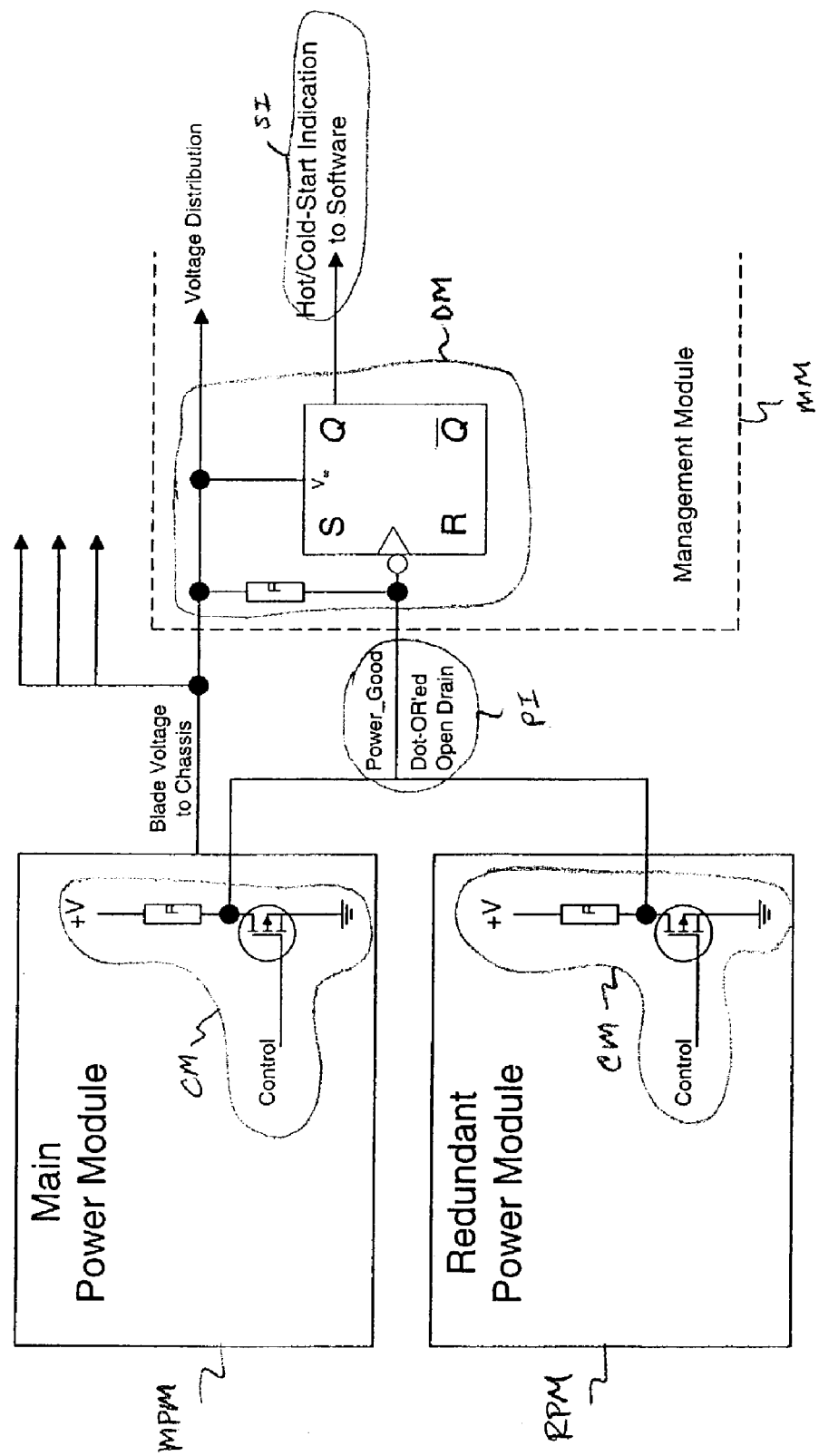
FIG. 6 is a logical diagram implementation, according to one embodiment of the present invention; and, FIG. 7 is a signal timing chart depicting a relationship of signals received by the management module, according to one embodiment of the present invention.

FIG. 6 is a logical implementation according to one embodiment of the present invention. Referring to FIG. 6, there is a Main Power Module, MPM, a Redundant Power Module, RPM, and a Management Module, MM. An operatively interconnected Controlling Means, CM, for signaling a Power Indication signal, PI, to a Detection Means, DM, on the Management Module, is also present on both the Main Power Module and the Redundant Power Module. The Power Indication signal, PI, is a time-delayed signal indicating a power status in relation to the chassis power, wherein the time delay is preferably approximately similar to a time difference between a first instance when power is received by the chassis and a second instance when the chassis is electrically stabilized. Preferably, once the Detection Means receives the Power Indication signal, an Indication signal is provided to a Software Means (not shown) operative connected with the Detection Means.

By way of example, in a preferred embodiment, the Controlling Means is a hardware circuit that is typically high impedance due to the presence of a "pull-up" on the Management Module. In another preferred embodiment, the Controlling Means is an Open Drain device whereby the control signal for each power source into a resident field effect transistor (FET) is also connected to a final output stage of the respective Main Power Module and the Redundant Power Module. In a further preferred embodiment, by using an open-drain device to drive the FET, the final output may also be controlled.

In operation, an open-drain device will be "low" when the input signal is "high" and the FET will pull the signal "high" when the input is "low." Consequently, in one aspect, the Open Drain device is sinking (i.e., flow) current in its low voltage active state, or is high impedance in its high voltage non-active state.

It will be readily apparent to those in the field, that the Controlling Means may comprise or be configured to be a hardware circuit, software, firmware, method steps, programming code, and the like, in any combination such that the Controlling Means provides a Power Indication signal to Detection Means on the Management Module.

By way of example, in a preferred embodiment, the Detection Means is a hardware circuit, such as a switching circuit having a clock state, that is operatively connected to receive a Power Indication signal, PI, from the Controlling Means, CM. In a further preferred embodiment, the Detection Means comprises or is configured to be a hardware circuit, software, firmware, method steps, programming code, and the like, in any combination such that the Detection Means receives a Power Indication signal from the Controlling Means. In a further preferred embodiment, the Detection Means provides an indication of the power status to operatively connected Software Means at SI, in relation to the received Power Indication signal, by either latching or not latching, so that the Software Means may then initiate a predetermined configuration for either a cold-start or a hot-plugable start.

It will be readily apparent to those in the field, that the Software Means may comprise or be configured to be a hardware circuit, software, firmware, method steps, programming code, and the like, in any combination such that the Software Means is able to receive a power configuration indication signal from the Management Module and is able to configure to a predetermined configuration for a hot-plugable or cold-start option. Although the Software means is preferably software code, such is not necessarily limited to solely programming code per se.

In operation, referencing FIG. 6, a favorable power indicator signal results where the Main Power Module or the Redundant Power Module are fully operational, as the control signal in either power module in effect pulls the power indicator signal to ground. Consequently, even where a power module were to be inadvertently failing, a favorable power indicator signal does not result. By way of example, for a cold-start scenario, the power indication signal latches the power up state, thereby signaling that the power-up sequence is a cold-start sequence. In this example, a status check of the Detection Means latching would indicate that Q has a logic value of 1 and that a cold-start sequence indication is to be provided to the Software Means.

By way of further example, if the Management Module is to be hot-plugged and the power indication signal, PI, is at a logic value of zero, a cold-start trigger will fail to be latched, such that the indication the Software Means receives will indicate a hot-plug indication at SI and the Software Means may then initiate a predetermined configuration for a hot-plugable option.

Figure 7:
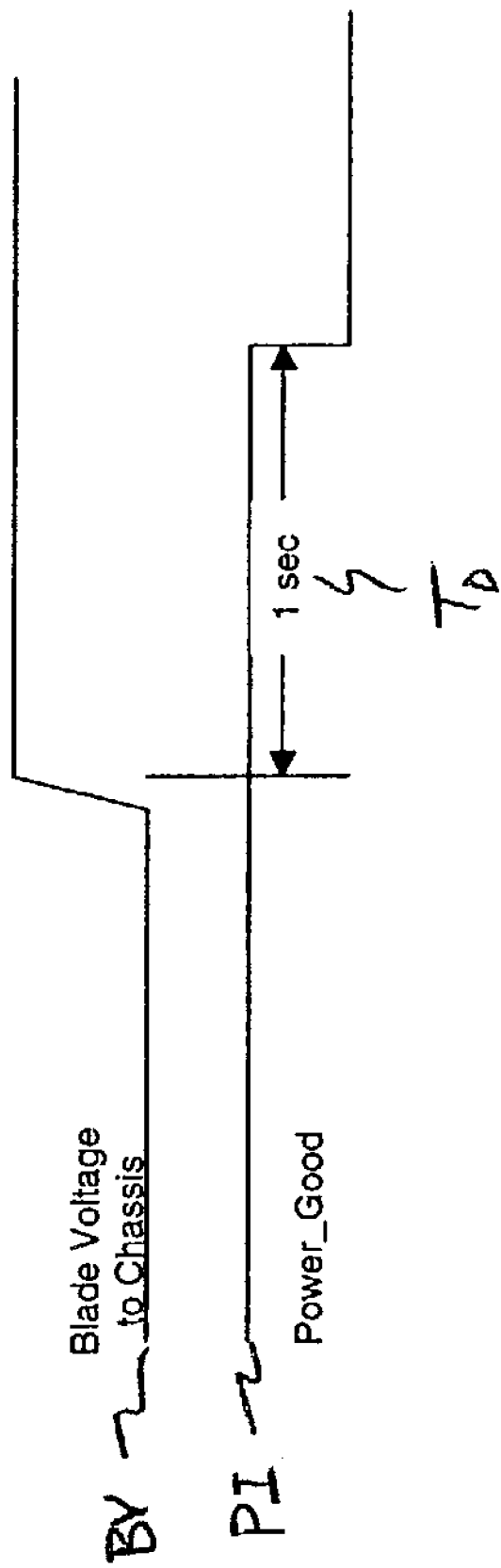

FIG. 7 is a signal timing chart depicting a relationship of signals received by the management module, according to one embodiment of the present invention. Referring to this figure, the Blade Voltage to Chassis signal, BV, is simultaneously compared with the Power Indication signal, PI, over time. A time delay, TD, of approximately 1 sec is also shown to correspond as the delay between the receipt of each of the two signals receipt at the Management Module. Although pictorially, FIG. 7 indicates a time delay of one second, the present invention is not so limited as it will be readily apparent to those in the field, that the time delay may be substantially lesser or greater, depending on the individual application of the present invention.

Furthermore, it is possible to select the configuration used for the above embodiment or properly change the configuration to another configuration as long as the new configuration is not deviated from the gist of the present invention.

As described above, according to the present invention, preferable cooling performance and noise characteristic can be realized even if a heat sink is decreased in size. Therefore, it is possible to contribute to the reduction of a computer in size and the improvement of the computer in performance by using the heat sink to cool a CPU or the like.

While the exemplary embodiments of the present invention have been described in part with respect to processes and implementation of circuits and software, the present invention is not so limited. As would be apparent to one skilled in the art, various functions of circuit elements and software may also be implemented in the digital domain as processing steps in a software program, or vice versa. Such software may be employed in, for example, a digital signal processor, micro-controller or general-purpose computer. It should also be noted that modules MPM, RPM, CM, DM, PI and SI of the present invention can be implemented with software, firmware, hardware or a combination thereof. The modules of the present invention need not be co-located, these modules can be located within various equipment throughout the data communication network and server system. In implementation, the operative links of the present invention can be wires, communication links or any well known implementations of connecting paths used in electronic or electrical circuits. Depending on the particular implementations of the modules, the data, information and control signals conveyed between the modules can be represented as digital signals, analog signals, optical signals, contents or memory locations in memory circuits, contents of registers that are part of firmware or software programs.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An apparatus comprising:
   a chassis for housing a plurality of information handling system blade servers,
   a plurality of power sources,
   each of said plurality of power sources having a power delay signal means,
   a management module having a power detection means and operatively connected to receive a delayed power indication signal from said plurality of power sources and provide a power configuration indication signal.

2. The apparatus according to claim 1, wherein said apparatus is operatively connected to activate Software means stored accessible to said plurality of power sources and said management module and effective when executing to configure a power state to a predetermined setting in response to receiving said power configuration indication signal.

3. The apparatus according to claim 1, wherein said chassis comprises a plurality of slots capable of operatively receiving a plurality of said blade servers and a mid-plane being operatively coupled with said plurality of power sources and said management module, for providing power signals to each of said plurality of slots.

4. The apparatus according to claim 3, wherein said power delay signal means indicates a status of power available in relation to a power state of said chassis.

5. The apparatus according to claim 4, wherein said power delay signal means indicates a status that is delayed by a time delay TD in relation to said power state of said chassis.

6. The apparatus according to claim 5, wherein the time delay TD is approximately one second, the power delay signal means is a power delay signal circuit, and the power detection means is a power detection circuit.

7. The apparatus according to claim 1, wherein said power detection means executes in response to a received delayed power indication signal to output a power configuration indication signal.

8. The apparatus according to claim 7, furthering comprising Software means operatively connected and stored accessible to said plurality of power sources and said management module and effective when executing to configure a power state to a predetermined setting in response to receiving said power configuration indication signal, wherein said software means receive said power configuration indication signal.

9. The apparatus according to claim 8, wherein a power state for said management module is configured to a predetermined setting by Software means in response to said power configuration indication signal.

10. The apparatus according to claim 9, wherein the Software means is programming instructions.

11. A method comprising the steps of:
housing a plurality of information handling system blade servers, a plurality of power sources, and a management module within a common chassis,
receiving a delayed power indication signal from one or more of said plurality of power sources at detection means of said management module, wherein said delayed power indication signal is of a value in relation to a chassis power state, and
providing a power configuration indication signal from said detection means for configuring a power state to a predetermined setting.

12. The method of claim 11, further comprising the step of providing said power configuration indication signal to program instructions stored accessible to said plurality of power sources and said management module and effective when executing to configure said power state to a predetermined setting.

13. The method of claim 12, wherein said predetermined setting is a hot-plugable state.

14. The method of claim 12, wherein said predetermined setting is a cold-start state.

15. A computer program product comprising:
a computer readable medium; and
program instructions stored on said medium accessibly to an information handling blade server and effective when executing to:
configure a power state for a management module to a predetermined setting in response to receiving a power configuration indication signal indicating a power status of a chassis of said information handling blade server; the power configuration indication signal sent in response to receiving a delayed power indication signal.

16. A system comprising:
a server having a chassis for housing a plurality of information handling system blade servers,
a plurality of power sources,
each of said plurality of power sources having a power delay signal means,
a management module having a power detection means and operatively connected to receive a delayed power indication signal from said plurality of power sources and provide a power configuration indication signal,
and a software means operatively connected and stored accessible to said plurality of power sources and said management module and effective when executing to configure a power state to a predetermined setting in response to receiving said power configuration indication signal.

17. The system of claim 16, further comprising a plurality of servers.

18. The system of claim 16, wherein said the power delay signal means is a power delay signal circuit, and the power detection means is a power detection circuit.

19. The system of claim 18, wherein said software means is programming instructions.

20. The system of claim 19, wherein said power delay signal circuit indicates a status that is delayed by a time delay of approximately one second in relation to said power state of said chassis, said power detection circuit executes in response to a received delayed power indication signal to output a power configuration indication signal.

* * * * *